United States Patent
Abdelmoneum et al.

(10) Patent No.: US 8,827,550 B2
(45) Date of Patent: Sep. 9, 2014

(54) THERMAL SENSOR USING A VIBRATING MEMS RESONATOR OF A CHIP INTERCONNECT LAYER

(75) Inventors: Mohamed A. Abdelmoneum, Portland, OR (US); Tawfik M. Rahal-Arabi, Tigard, OR (US); Gregory F. Taylor, Portland, OR (US); Kevin J. Fischer, Hillsboro, OR (US); Andrew Yeoh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 513 days.

(21) Appl. No.: 12/646,833

(22) Filed: Dec. 23, 2009

(65) Prior Publication Data

US 2011/0150031 A1 Jun. 23, 2011

(51) Int. Cl.
*G01K 11/00* (2006.01)
*G01K 7/32* (2006.01)

(52) U.S. Cl.
CPC ........................................ *G01K 7/32* (2013.01)
USPC ............................................................ 374/117

(58) Field of Classification Search
None
See application file for complete search history.

(56) References Cited

U.S. PATENT DOCUMENTS

| | | | |
|---|---|---|---|
| 4,437,773 A * | 3/1984 | Dinger et al. ................. | 374/117 |
| 4,448,546 A | 5/1984 | Paros | |
| 4,459,042 A | 7/1984 | Paros | |
| 4,986,670 A | 1/1991 | Uchiyama et al. | |
| 5,506,497 A * | 4/1996 | Klein et al. ................... | 324/71.6 |
| 5,772,322 A * | 6/1998 | Burns et al. .................. | 374/118 |
| 6,985,051 B2 | 1/2006 | Nguyen et al. | |
| 7,427,905 B2 | 9/2008 | Lutz et al. | |
| 7,541,004 B2 | 6/2009 | Niksa et al. | |
| 7,924,109 B2 | 4/2011 | Ogasawara | |
| 8,258,893 B2 * | 9/2012 | Quevy et al. .................. | 333/186 |
| 2003/0051550 A1 * | 3/2003 | Nguyen et al. ............. | 73/514.36 |
| 2004/0016989 A1 * | 1/2004 | Ma et al. ........................ | 257/528 |
| 2004/0207492 A1 * | 10/2004 | Nguyen et al. ................ | 333/199 |
| 2007/0108383 A1 * | 5/2007 | Combes et al. ............ | 250/338.1 |
| 2007/0247245 A1 | 10/2007 | Hagelin | |
| 2008/0144695 A1 * | 6/2008 | Hamada ........................ | 374/117 |
| 2008/0262773 A1 * | 10/2008 | Howell .......................... | 702/99 |
| 2009/0085191 A1 * | 4/2009 | Najafi et al. .................. | 257/698 |

(Continued)

FOREIGN PATENT DOCUMENTS

| | | |
|---|---|---|
| EP | 2098852 | 9/2009 |
| JP | 01145539 | 6/1989 |

(Continued)

OTHER PUBLICATIONS

"PCT International Search Report and Written Opinion of the International Searching Authority for PCT Patent Application No. PCT/US2010/058356", (Aug. 31, 2011), Whole Document.

(Continued)

*Primary Examiner* — Mirellys Jagan
(74) *Attorney, Agent, or Firm* — Blakely, Sokoloff, Taylor & Zafman LLP

(57) ABSTRACT

Methods and apparatuses for Micro-Electro-Mechanical Systems (MEMS) resonator to monitor temperature in an integrated circuit. Fabricating the resonator in an interconnect layer provides a way to implement thermal detection means which is tolerant of manufacturing process variations. Sensor readout and control circuits can be on silicon if desired, for example, a positive feedback amplifier to form an oscillator in conjunction with the resonator and a counter to count oscillator frequency.

18 Claims, 9 Drawing Sheets

(56) References Cited

U.S. PATENT DOCUMENTS

| | | | |
|---|---|---|---|
| 2009/0108381 A1* | 4/2009 | Buchwalter et al. | 257/415 |
| 2009/0276990 A1* | 11/2009 | Horie et al. | 29/25.35 |
| 2010/0032268 A1* | 2/2010 | Suilleabhain et al. | 200/181 |
| 2010/0032789 A1* | 2/2010 | Schoen et al. | 257/467 |
| 2010/0088865 A1* | 4/2010 | Ashour | 24/593.1 |
| 2011/0000280 A1* | 1/2011 | Whalen et al. | 73/24.06 |
| 2011/0150030 A1* | 6/2011 | Abdelmoneum et al. | 374/117 |
| 2012/0056281 A1* | 3/2012 | Mohanakrishnaswamy et al. | 257/415 |
| 2012/0229220 A1* | 9/2012 | Quevy et al. | 331/41 |
| 2012/0280594 A1* | 11/2012 | Chen et al. | 310/313 R |
| 2013/0285171 A1* | 10/2013 | Najafi et al. | 257/415 |

FOREIGN PATENT DOCUMENTS

| | | |
|---|---|---|
| JP | 2009097951 | 5/2009 |
| JP | 2009178778 | 8/2009 |
| TW | 200943501 | 10/2009 |

OTHER PUBLICATIONS

Huang, et al., "Fully Monolithic CMOS Nickel Micromechanical Resonator Oscillator, IEEE MEMS 2008.", (2008), pp. 10-13.

Huang, et al., "Nickel Vibrating Micromechanical Disk Resonator with Solid Dielectric Capacitive-Transducer Gap, 2006 IEEE FCS.", (2006), pp. 839-847.

Jha, et al., "CMOS-Compatible Dual-Resonator Temperature Sensor With Milli-Degree Accuracy, 2007 IEEE Sensors & Actuator.", (2007), pp. 229-232.

Koskenvouri, et al., "Temperature Measurement and Compensation Based on Two Vibrating Modes of a Bulk Acoustic Mode Microresonator, IEEE MEMS 2008,", (2008), pp. 78-81.

Teva, et al., "From VHF to UHF CMOS-MEMS Monolithically Integrated Resonators, IEEE MEMS 2008 .", (2008), pp. 82-85.

"Office Action for Chinese patent Application No. 201010609237.1", (Apr. 27, 2013), Whole Document.

"Office Action and Search Report for Taiwan Patent Application No. 99140390", (May 3, 2013), Whole Document.

"Office Action for Japanese Patent Application No. 2012-545983", (Oct. 2, 2013), Whole Document.

"Office Action for Korean Patent Application No. 10-2012-7016968", (Feb. 25, 2014), Whole Document.

* cited by examiner

THERMAL SENSOR USING A VIBRATING MEMS RESONATOR OF A CHIP INTERCONNECT LAYER

BACKGROUND

1. Technical Field

Embodiments of the invention relate to thermal sensors. More particularly, embodiments of the invention relate to design, manufacture and use of Micro Electro Mechanical (MEMS) thermal sensors in an interconnect layer of an integrated circuit.

2. Background Art

Thermal sensing on integrated circuits has previously relied upon nano-meter size, transistor based thermal sensors which operate according to a voltage reference. For example, current thermal sensors in processor cores include a bipolar transistor using a bandgap reference to detect temperature, where the voltage across a junction will change with temperature.

However, these thermal sensor techniques rely upon analog transistors which, due to their size, are very sensitive to manufacturing process variations. Such sensitivity impacts the sensor accuracy and linearity. Thermal sensor accuracy and linearity are critical to operations of a processor core, for example, since they can lead to power loss platform noise, reliability degradation and platform performance loss.

Due to continuing process scaling, process variations have an increasingly severe affect on the accuracy of thermal sensing transistors which rely upon a bandgap voltage reference. In addition, a critical thermal limit for operation of an integrated circuit is often in the interconnect layer and not in the transistor layer.

BRIEF DESCRIPTION OF THE DRAWINGS

The various embodiments of the present invention are illustrated by way of example, and not by way of limitation, in the figures of the accompanying drawings and in which.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Increased thermal sensing may be used to support improved system performance. However, in order to achieve wide acceptance, the costs of increased thermal sensing must be within an acceptable range. Described herein is a resonator structure that may provide an inexpensive, accurate thermal sensing solution that can support increased thermal sensing applications.

In one embodiment, a Micro-Electro-Mechanical Systems (MEMS) resonator is to monitor temperature of an interconnect layer of an integrated circuit (IC). Sensor readout and control circuits can be on silicon if desired, for example, a positive feedback amplifier to form an oscillator in conjunction with the resonator and a counter to count oscillator frequency. In one embodiment, a thermal sensor that takes advantage of the low deposition temperature of copper—e.g. by patterning a copper resonator structure in an IC's interconnect layer—may be utilized. Further, use of copper as the resonator structural material may increase the thermal dependence of the resonator frequency on temperature and hence improve the overall sensor accuracy. In one embodiment, the resonator may be connected in a positive feedback topology with a transimpedance amplifier that can be formed on silicon to provide an oscillator. The output of the oscillator is a signal with a frequency that is dependent on the resonator temperature and the frequency is counted with a simple counter circuit that can also be implemented on silicon.

Figure 1:
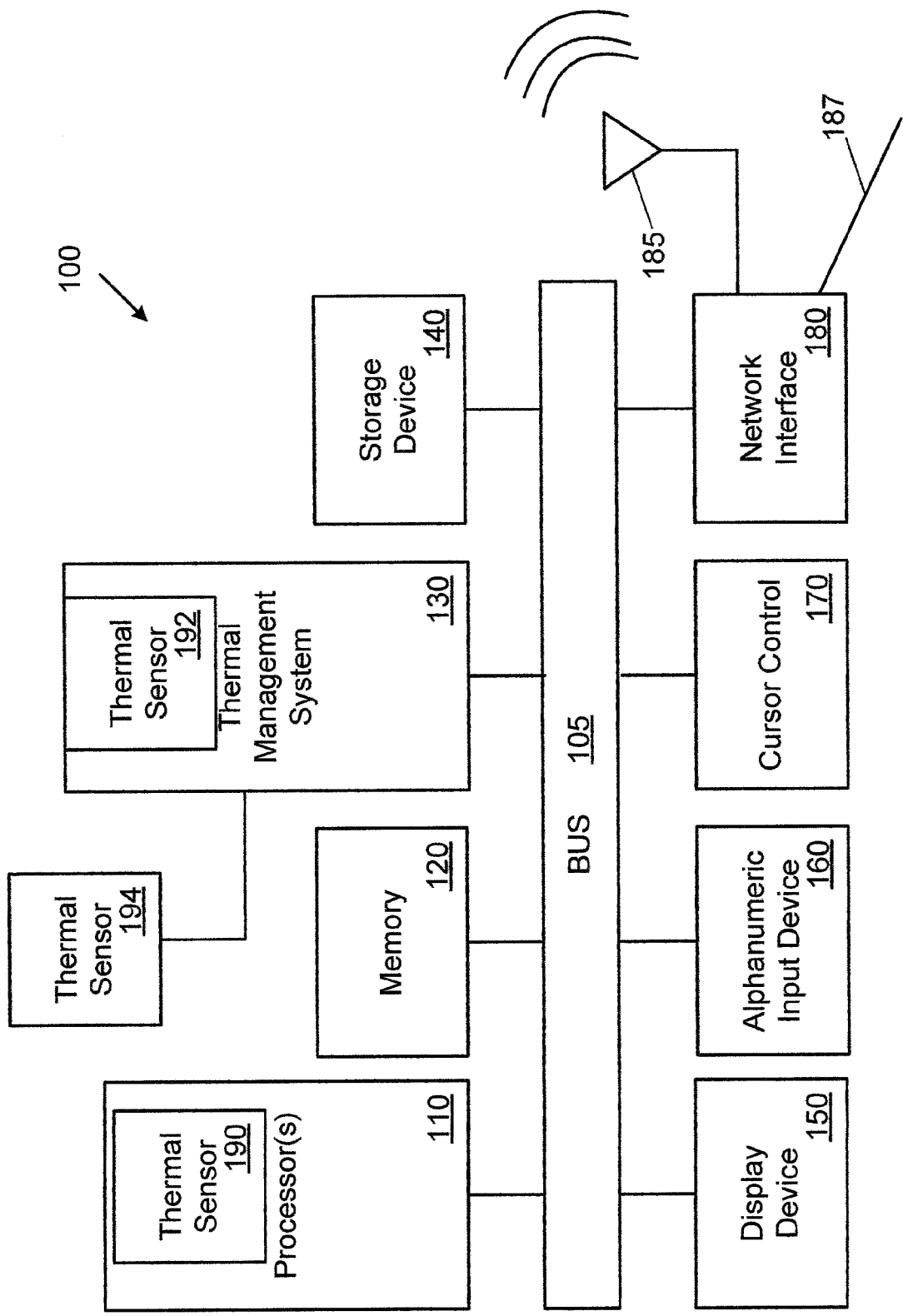
FIG. 1 is a block diagram illustrating select elements of an electronic system having a thermal sensor according to an embodiment.

FIG. 1 is a block diagram of one embodiment of an electronic system having thermal sensors. The electronic system illustrated in FIG. 1 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Electronic system 100 may have any number of thermal sensors, which may include resonator structures and/or thermal diodes. The example of FIG. 1 includes three thermal sensors (190, 192 and 194); however, any number of thermal sensors can be supported. The thermal sensors may be used to monitor temperature of various components and/or areas of electronic system 100.

Electronic system 100 includes bus 105 or other communication device to communicate information, and processor 110 coupled to bus 105 that may process information. While electronic system 100 is illustrated with a single processor, electronic system 100 may include multiple processors and/or co-processors. Electronic system 100 further may include random access memory (RAM) or other dynamic storage device (included in memory 120), coupled to bus 105 and may store information and instructions that may be executed by processor 110. Memory 120 may also be used to store temporary variables or other intermediate information during execution of instructions by processor 110. Memory 120 may also include read only memory (ROM) and/or other static storage device that may store static information and instructions for processor 110.

Electronic system 100 may include thermal management system 130 that may provide thermal monitoring and/or cooling functionality. Thermal management system 130 may include one or more fans and/or one or more liquid cooling mechanisms to cool various components of electronic system 100. Further, thermal management system 130 may include monitoring circuitry to monitor the temperature of various component and areas in electronic system 100. Data storage device 140 may be coupled to bus 105 to store information and instructions. Data storage device 140 such as a magnetic disk or optical disc and corresponding drive may be coupled to electronic system 100.

Electronic system 100 may also be coupled via bus 105 to display device 150, such as a cathode ray tube (CRT) or liquid crystal display (LCD), to display information to a user. Alphanumeric input device 160, including alphanumeric and other keys, may be coupled to bus 105 to communicate information and command selections to processor 110. Another type of user input device is cursor control 170, such as a mouse, a trackball, or cursor direction keys to communicate direction information and command selections to processor 110 and to control cursor movement on display 150.

Electronic system 100 further may include network interface(s) 180 to provide access to a network, such as a local area network. Network interface(s) 180 may include, for example, a wireless network interface having antenna 185, which may represent one or more antenna(e). Network interface(s) 180 may also include, for example, a wired network interface to communicate with remote devices via network cable 187, which may be, for example, an Ethernet cable, a coaxial cable, a fiber optic cable, a serial cable, or a parallel cable.

In one embodiment, network interface(s) 180 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 2:
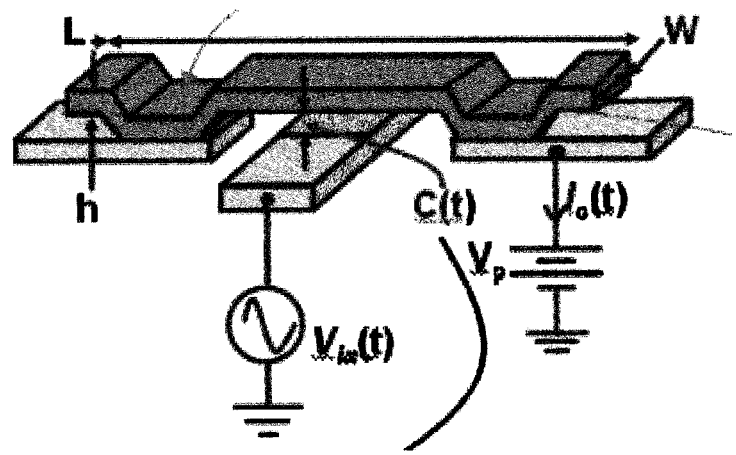
FIG. 2 is a physical representation of select elements of a resonator that may be used as a thermal sensor according to an embodiment.

FIG. 2 is a physical representation of one embodiment of a resonator that may be used as a thermal sensor. The example of FIG. 2 is that of a clamped-clamped beam MEMS resonator. The frequency of the resonator may be described as:

$$f_o = \frac{1}{2\pi}\sqrt{\frac{k_{e\!f\!f}}{m_{e\!f\!f}}} \approx 1.03\sqrt{\frac{E}{\rho}}\frac{h}{L^2}$$

where $k_{e\!f\!f}$ is the effective stiffness of the resonator material, $m_{e\!f\!f}$ is the effective mass of the resonator material, E is Young's Modulus and $\rho$ is the density of the resonator material. Thus, as the capacitance, C(t), changes with flexure of the resonator structure, the voltage, $V_{in}(t)$, applied to the resonator structure results in a proportional change in output current, $I_o(t)$.

Figure 3A:
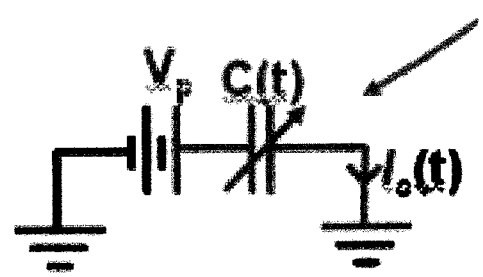
FIG. 3A is a circuit diagram representation of select elements of a resonator that may be used as a thermal sensor according to an embodiment.

FIG. 3A is a circuit diagram representation of one embodiment of a resonator that may be used as a thermal sensor. The circuit diagram of FIG. 3A models the variable capacitance of the resonator structure as a variable capacitor in which the output current may be described as:

$$i_o = V_p \frac{\partial C(t)}{\partial t}.$$

Figure 3B:
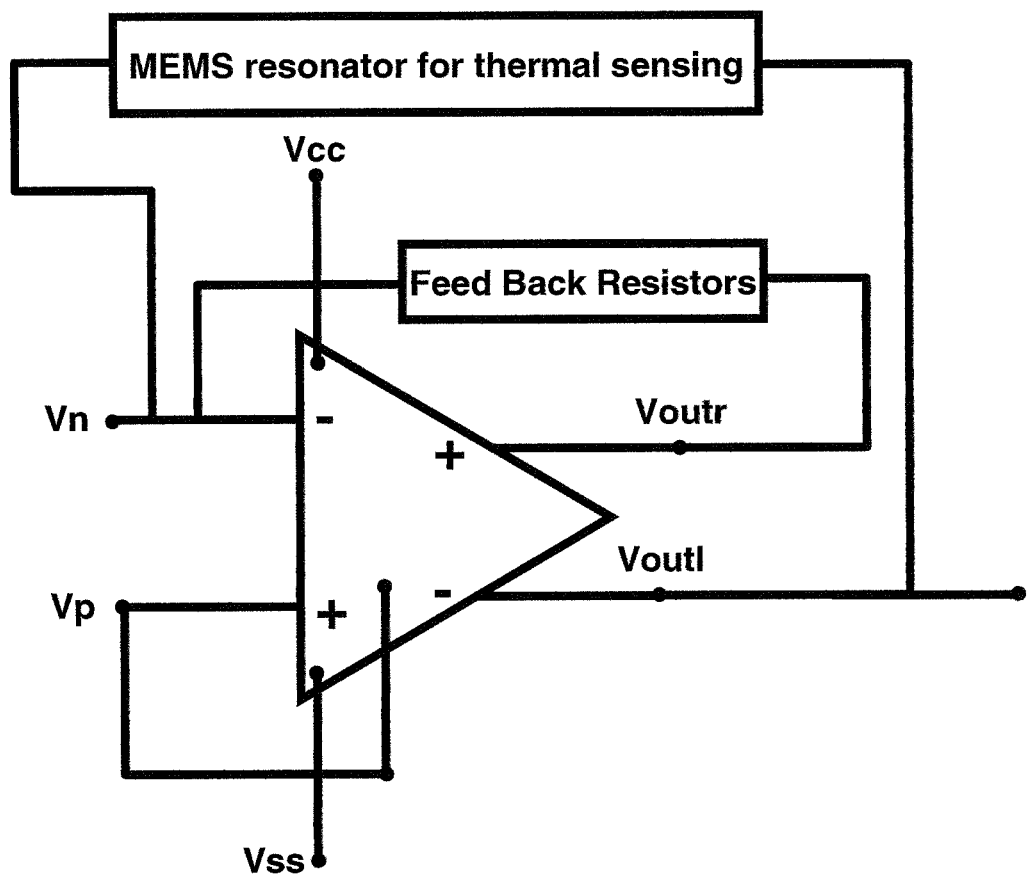
FIG. 3B is an equivalent circuit diagram representation of select elements of a circuit for generating an electrical signal according to an embodiment.

FIG. 3B is a circuit for generating an electrical signal according to one embodiment. The circuit illustrated in FIG. 3B generates an output electrical signal Voutl from a differential amplifier having a MEMS resonator on one feedback loop of the differential amplifier and one or more impedance elements—e.g. resistors—on another feedback path of the differential amplifier. The output electrical signal Voutl may represent—e.g. to thermal management or other control logic—a thermal condition of an interconnect layer in which the MEMS resonator is located. It is understood that the circuit illustrated in FIG. 3B is illustrative of one of many different mechanisms for generating such thermal sensing electrical signals based on resonance of a MEMS resonator.

Figure 4A:
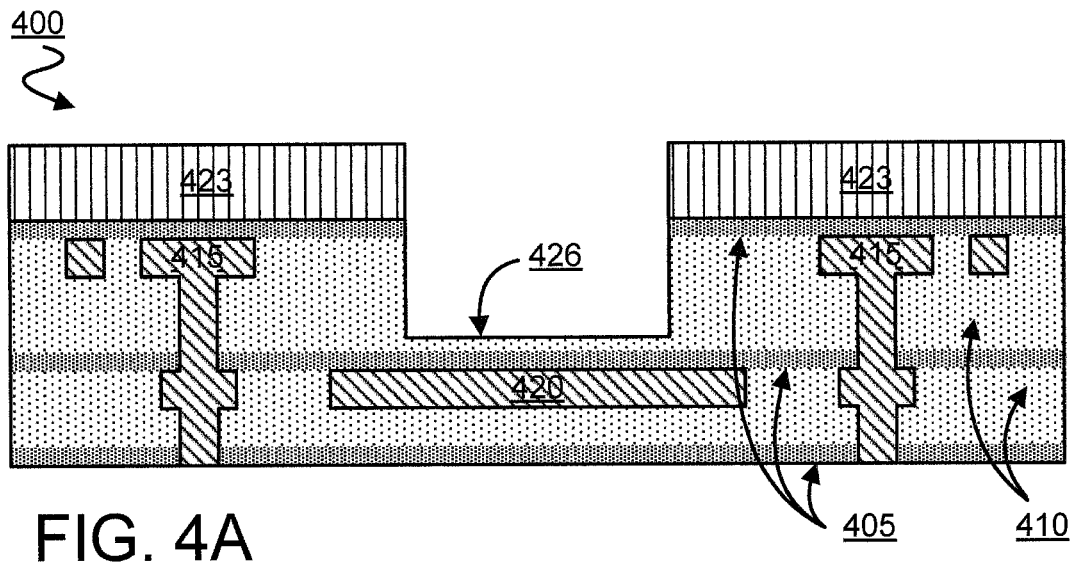
FIGS. 4A through 4I are block diagrams illustrating select operations of a process according to an embodiment for manufacturing in an interconnect layer a MEMS resonator structure that may be used as a thermal sensor.

FIGS. 4A-4I illustrate select operations of a process according to an embodiment for manufacturing in an interconnect layer a MEMS resonator structure that may be used as a thermal sensor. FIG. 4A illustrates an early stage of material for manufacturing a MEMS resonator structure. An interconnect layer 400 of a silicon wafer may include one or more component layers—e.g. layers including at least one dielectric material layer. For example, interconnect layer 400 may include one or more layers of a first dielectric 405—e.g. a silicon nitride such as $Si_3N_4$, for example. In an embodiment, the first dielectric 405 may be doped—for example, with carbon to form a carbon doped oxide (CDO). Alternatively or in addition, interconnect layer 400 may include one or more layers of a second material 410—e.g. a dielectric such as silicon nitride or a barrier metal layer.

The first dielectric layer and the second dielectric (or barrier metal) layer may be selected to achieve selectivity between a dielectric layer and another dielectric (or barrier metal) layer, the selectivity to achieve structures such as those represented in FIGS. 4A-4I to create an air gap between the resonator and the dielectric layer. It is understood that techniques for achieving such selectivity are known in the art. Although described herein in terms of various layers of two different dielectric materials 405, 410, it is understood that certain embodiments of the invention may variously include corresponding layers of a dielectric material and at least one barrier metal.

The one or more component layers of interconnect layer 400 may position therein one or more interconnect structures, represented in FIG. 1 by exemplary vias 415. The one or more component layers of interconnect layer 400 may further position therein an electrode 420. In an embodiment, one or more of vias 415 and electrode 420 may be copper.

For manufacturing of a MEMS resonator structure, a photoresist layer 423 may be deposited on a top dielectric layer—here a layer of second dielectric 410. A channel may then be created—e.g. by lithography—which extends through the photoresist layer 423 and into various component layers of interconnect layer 400. In an embodiment, a bottom 426 of the channel may be separated from the electrode 420 by dielectric material which will allow for a capacitive gap. The capacitive gap may provide for free vibration of the resonator, as discussed below.

Figure 4B:
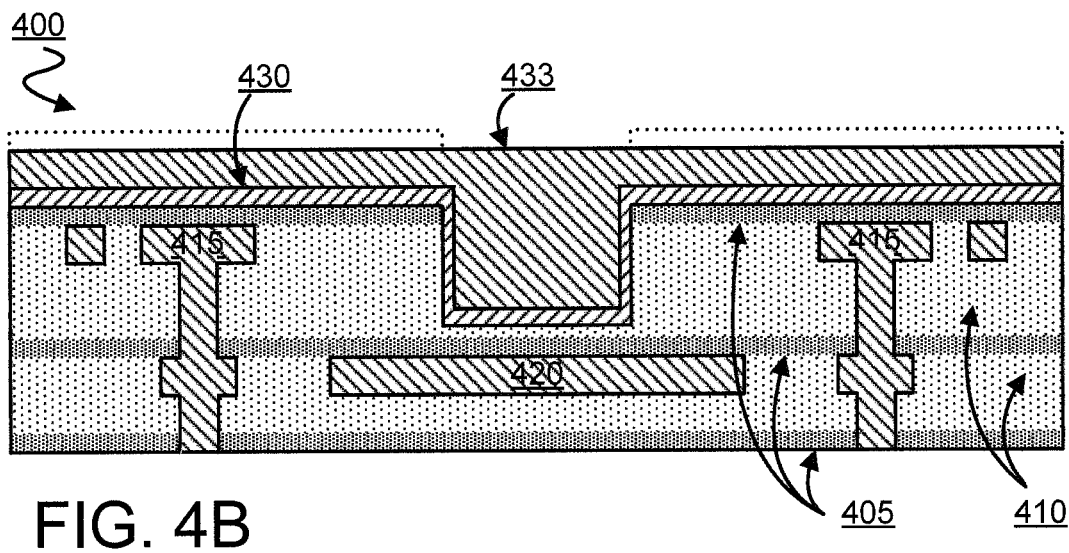

FIG. 4B illustrates a depositing of a layer 430 first metal and a layer 433 of a second metal on a top surface of the interconnect layer 400 after photoresist layer 423 is removed. The first metal and second metal may be selected to achieve selectivity between the two metals, the selectivity to achieve structures represented in FIGS. 4A-4I. In an embodiment, the second metal may be copper, whereas the first metal is a metal—e.g. titanium, cobalt, etc.—having a susceptibility to wet etch which is sufficiently selective with respect to the susceptibility of copper to wet etch. It is understood that techniques for achieving such selectivity are known in the art.

Layer 430 may include a sacrificial layer of titanium or other suitable metal. The depositing of layer 433 on top of layer 430 may include first depositing a seed layer (not shown) of the second metal—e.g. of copper—over layer 430, followed by electroplating more of the second metal on the seed layer.

Figure 4C:
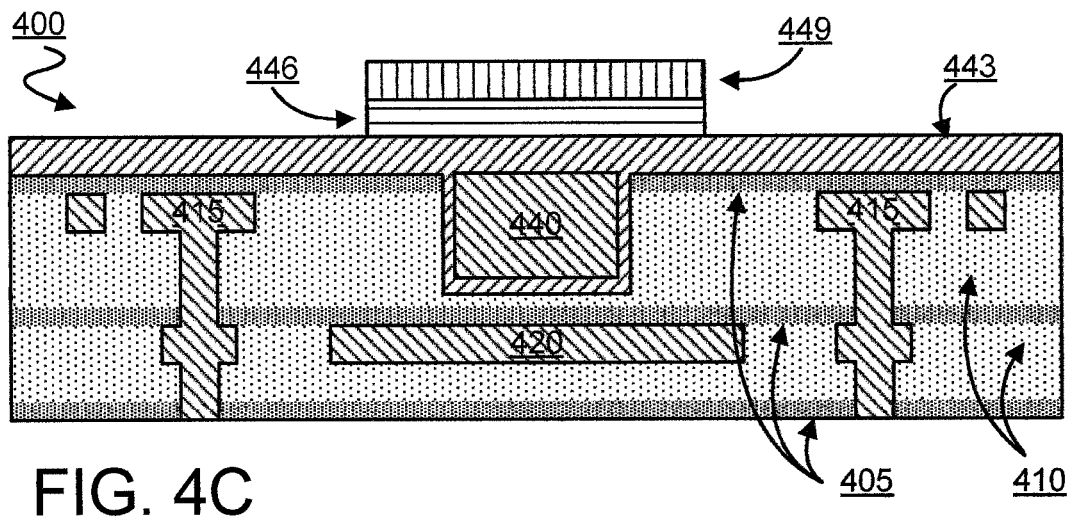

FIG. 4C illustrates creation of a resonator structure 440. Most of layers 430 and 433 are removed—e.g. by chemical mechanical polishing—to leave a resonator structure 440 in the channel. A capacitive gap between resonator structure 440 and electrode 420 allows free vibration of the resonator. The resonator will vibrate when the frequency of the input signal (coming from the feed back amplifier) matches the natural frequency of the resonator. When the resonator vibrates, it creates a time varying capacitor between the stationary electrode and the vibrating resonator as the second electrode and across the air gap between the resonator and the stationary electrode. An applied DC bias across such time varying capacitor will source an output current at a frequency equal to the vibration frequency and that output current flows back into the input of the transimpedance amplifier of FIG. 3B, for example, closing the feedback loop and defining the overall electronic oscillator frequency. In other words, the operational frequency of the oscillator circuit is defined by the frequency of vibration of the mechanical resonator. When the temperature changes, the resonator frequency will change and hence the frequency of oscillation of the electronic circuit will change indicating the temperature.

An additional sacrificial layer 443 of the first metal is deposited on a top surface of the interconnect layer 400. A block 446 of sacrificial light absorbing material (SLAM) is deposited on the sacrificial layer 443 above the resonator structure 440, and a block 449 of photoresist is deposited over the block 446. Blocks 446 and 449 are in preparation for partial removal of sacrificial layer 443.

Figure 4D:
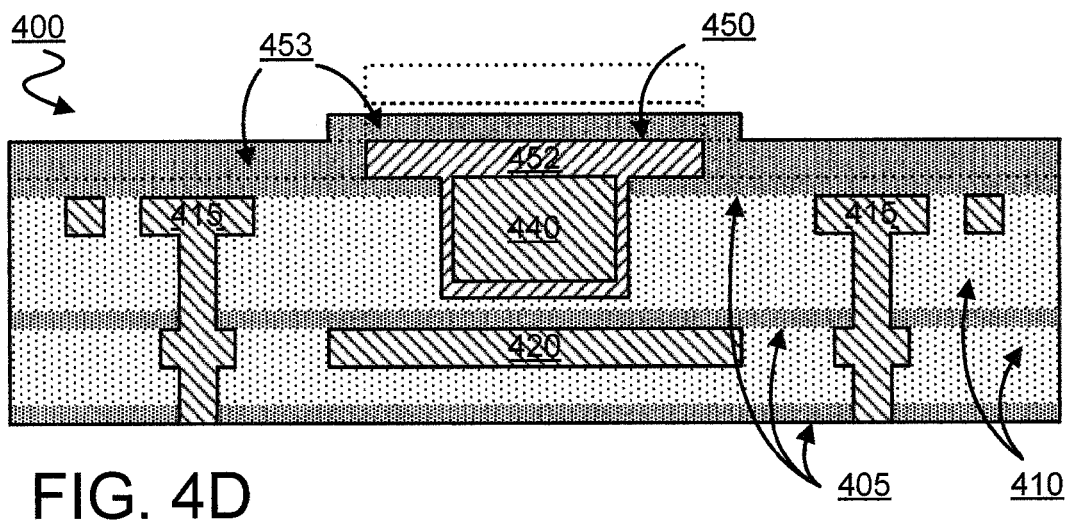

FIG. 4D illustrates creation of a shell 450 around the resonator structure 440. Etching may be applied to remove areas of layer 443 which are not covered by the block 446. Cleaning then removes blocks 446 and 449. Thereafter, an additional layer 453 of the first dielectric 405 may be deposited on a top surface of the interconnect layer. At this point, the resonator structure 440, which is composed of the second metal, is surrounded by a shell 450 of the first metal. Shell 450 may include a cap 452 which extends horizontally to cover a width of resonator structure 440.

Figure 4E:
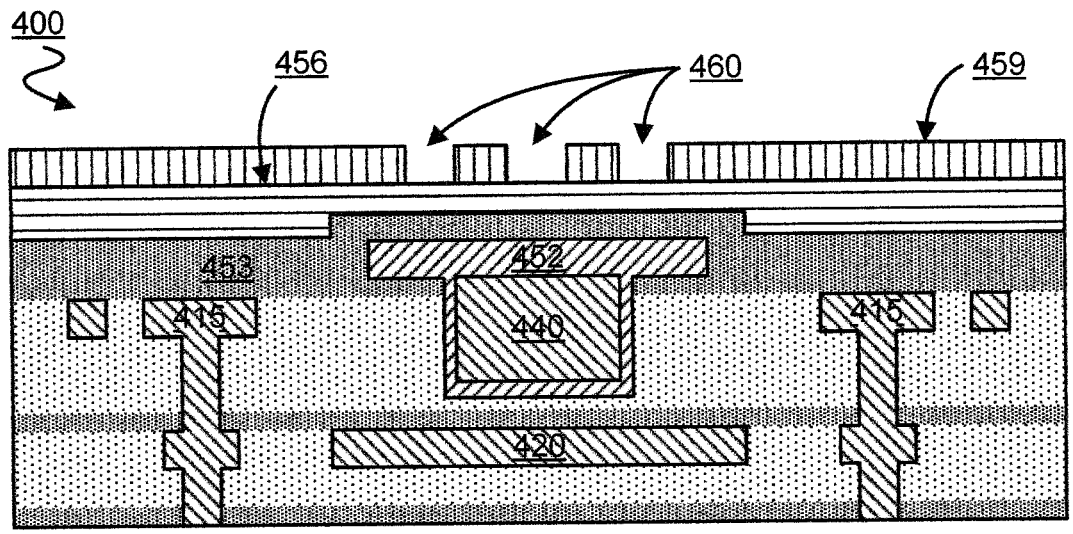
Figure 4F:
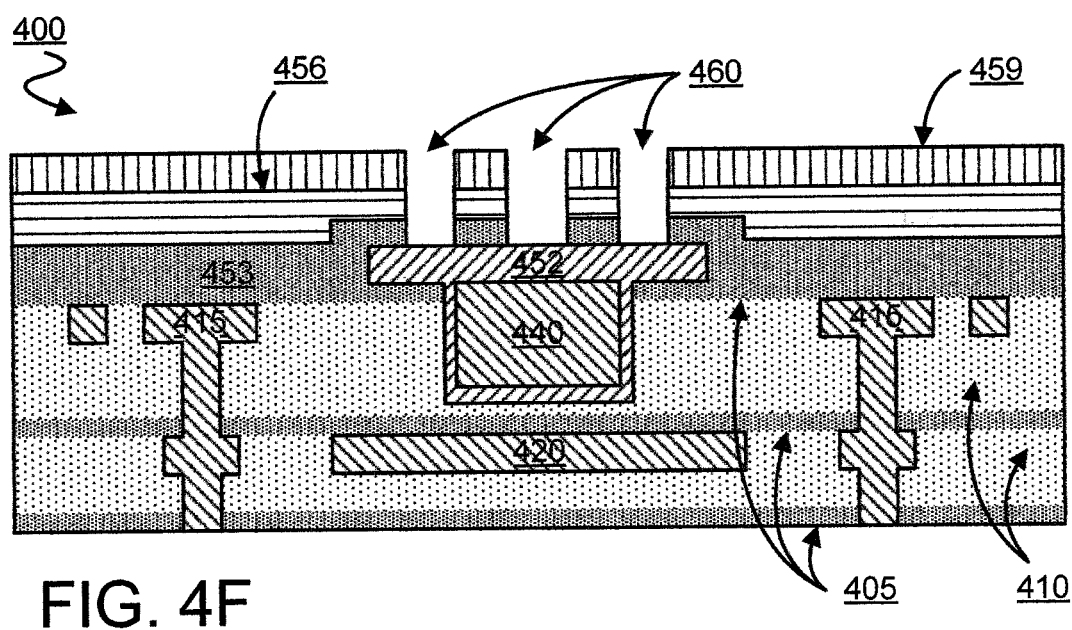

FIGS. 4E and 4F illustrates initial preparations to remove the shell 450 of the first metal from around resonator structure 440. A SLAM layer 456 is deposited on a top surface of interconnect layer 400. Thereafter, a photoresist layer 459 is deposited over the SLAM layer 456. One or more channels 460 are etched—e.g. by lithography—into the photoresist layer 459 at respective points above the shell 450. Additional etching is applied, as shown in FIG. 4F, to extend the one or more channels 460 down past the dielectric layer to expose portions of the shell 450—e.g. to expose the cap 452.

Figure 4G:
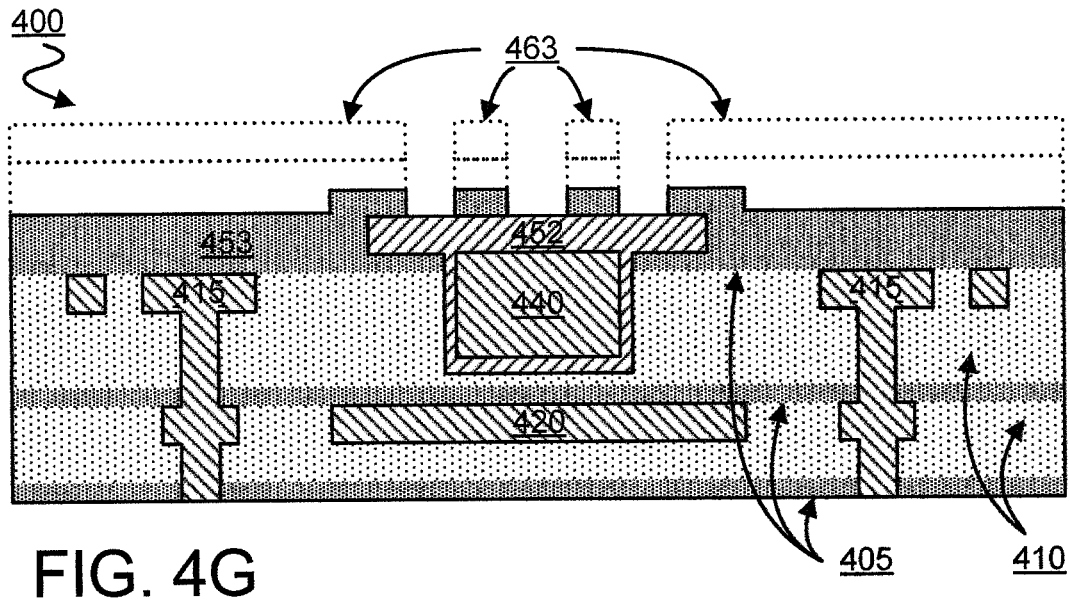
Figure 4H:
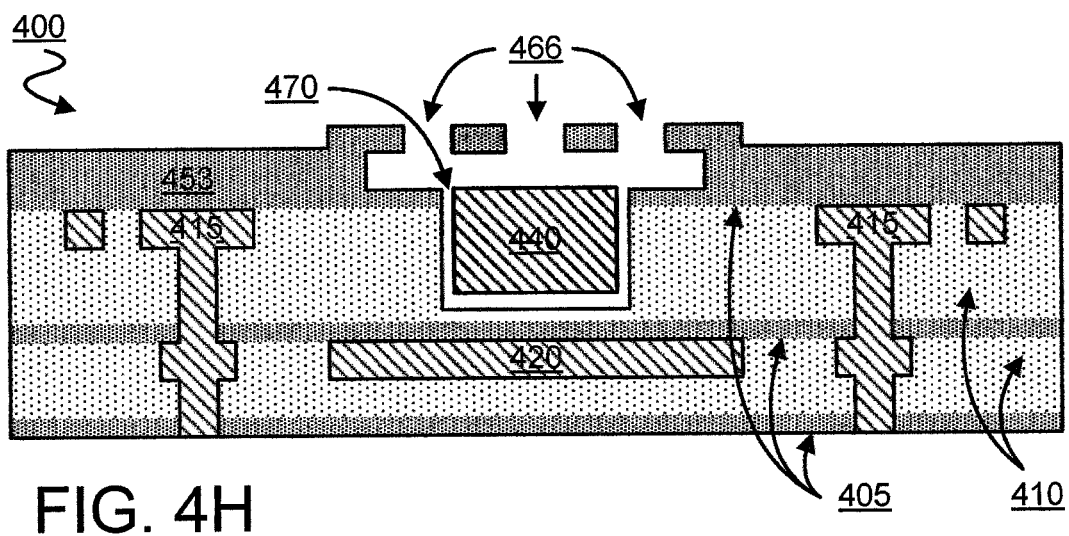
Figure 4I:
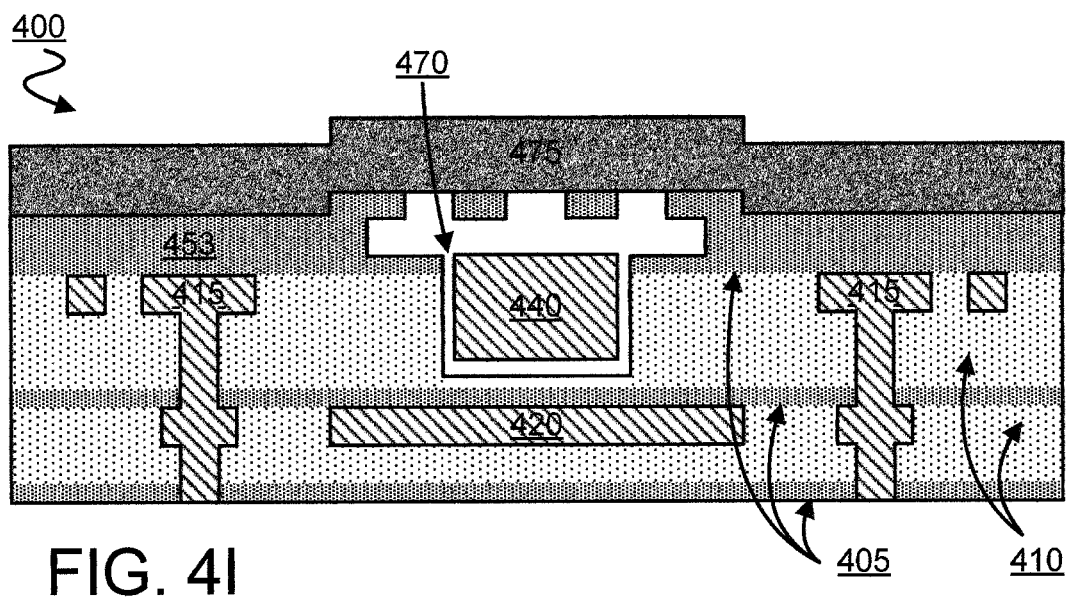

FIGS. 4G and 4H illustrate operations to remove the shell 450. Cleaning may be applied for a removal 463 of the layers 456 and 459. The openings 466 in the raised area of layer 453 provide a means for exposing the first metal of the shell 450 to wet etching. Due to a selectivity between the first metal and the second metal, the wet etching removes only the material of shell 450, creating a gap area 470 for resonator structure 440 to resonate within the channel. As shown in FIG. 4I, a region of interconnect layer 400 which includes the resonator structure 440 may then be covered with a nitride seal 475.

Figure 5:
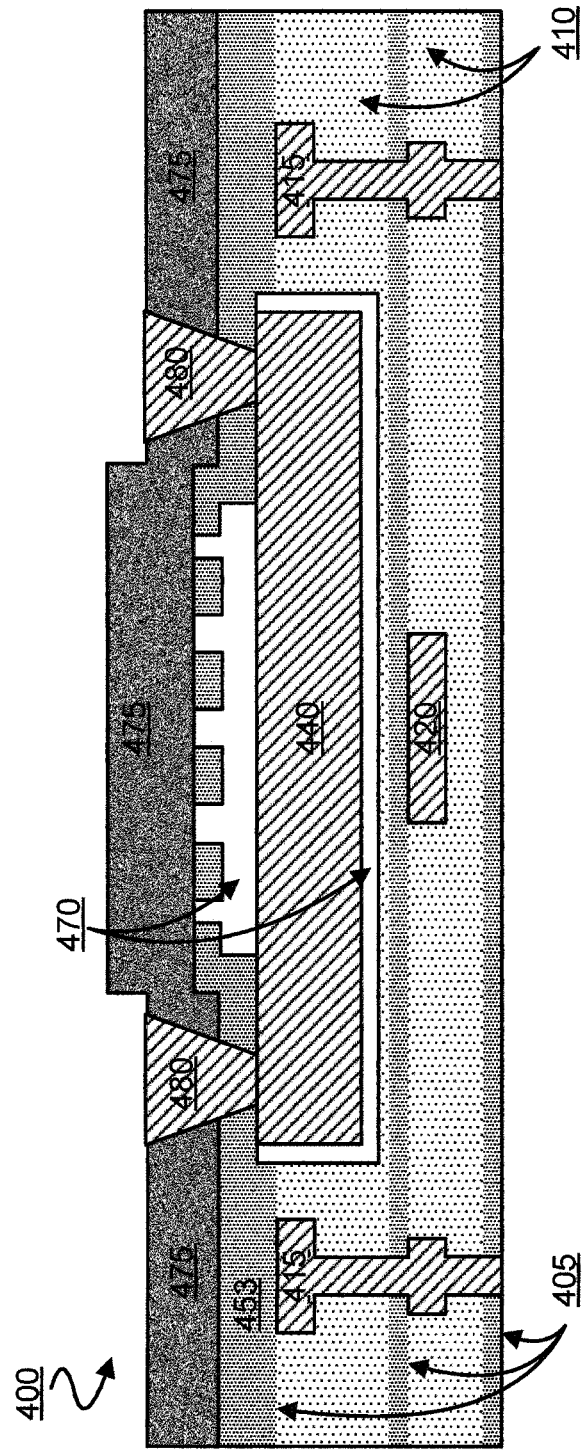
FIG. 5 is a block diagram illustrating select elements of a MEMS resonator structure in an interconnect layer that may be used as a thermal sensor, according to an embodiment.

FIG. 5 illustrates select elements of interconnect layer 400 as seen from another cross-sectional view. The cross-sectional view of FIG. 5 may, for example, be orthogonal with respect to the cross-sectional view of FIGS. 4A through 4I. The one or more component layers of a first dielectric 405 and a second dielectric 410 are shown, with various interconnect structures—e.g. vias 415—positioned therein. It is understood that the vias 415 shown in FIG. 5 may be different from those vias 415 shown in FIGS. 4A through 4I.

The resonator structure 440—e.g. a resonator beam—is surrounded by a gap region 470 which allows the resonator structure 440 to resonate within its channel above electrode 420. The resonator structure 440 may be partially supported, restrained or otherwise positioned by other structures of the interconnect layer 400. For example, portions of layer 453 may be in contact with resonator structure 440 at respective ends thereof. Additionally or alternatively, output electrodes 480 may extend though nitride seal 475 and come into contact with resonator structure 440 at respective ends thereof. The output electrodes 480 may further provide for converting a resonance of the resonating structure 480 into a thermal detection signal—e.g. by thermal detection circuitry (not shown). It is understood that circuitry to convert a resonance signal into a thermal detection signal is well known in the art, and may vary according to different implementation.

Techniques and architectures for thermal sensing in an integrated circuit are described herein. In the description herein, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An integrated circuit comprising:
    an interconnect layer including a layer of a dielectric material and a plurality of interconnects extending through the layer of the dielectric material, wherein the layer of the dielectric material comprises a channel formed therein, wherein sidewalls of the channel are formed by the dielectric material;
    a micro-electro-mechanical system (MEMS) resonator structure to provide an output signal corresponding to a temperature detected by the resonator structure, wherein a metal portion of the resonator structure is disposed within the channel, wherein the metal portion of the resonator structure includes exterior sides which each face a respective opposing sidewall formed by the dielectric material, wherein an air gap separates the exterior sides of the metal portion of the resonator structure each from the respective opposing sidewall formed by the dielectric material, the air gap to allow the metal portion of the resonator structure to resonate within the channel; and
    a seal enclosing the MEMS resonator structure with the interconnect layer, wherein one or more vias extend through the seal and couple to the resonator structure, wherein the resonator structure is suspended in the channel with the one or more vias.

2. The integrated circuit of claim 1 further comprising a circuit to receive the output signal from the resonator structure and to analyze the output signal to determine the temperature detected by the resonator structure.

3. The integrated circuit of claim 1 wherein the output signal from the resonator structure comprises a current that corresponds to a change in capacitance when the resonator vibrates at one of its natural frequencies, the change in the frequency of the output current capacitance corresponding to a change in temperature.

4. The integrated circuit of claim 1 wherein the resonator structure comprises at least a copper resonator.

5. The integrated circuit of claim 1 wherein the integrated circuit is a microprocessor chip.

6. A system comprising:
    an integrated circuit including:
        an interconnect layer including a layer of a dielectric material and a plurality of interconnects extending through the layer of the dielectric material, wherein the layer of the dielectric material comprises a channel formed therein, wherein sidewalls of the channel are formed by the dielectric material;
        a micro-electro-mechanical system (MEMS) resonator structure to provide an output signal corresponding to a temperature detected by the resonator structure, wherein a metal portion of the resonator structure is disposed within the channel, wherein the metal portion of the resonator structure includes exterior sides which each face a respective opposing sidewall formed by the dielectric material, wherein an air gap separates the exterior sides of the metal portion of the resonator structure each from the respective opposing sidewall formed by the dielectric material, the air gap to allow the metal portion of the resonator structure to resonate within the channel;
        a seal enclosing the MEMS resonator structure with the interconnect layer, wherein one or more vias extend through the seal and couple to the resonator structure, wherein the resonator structure is suspended in the channel with the one or more vias; and
        a connector to receive the output signal; and
    a circuit coupled with the connector to receive the output signal from the resonator structure and to analyze the output signal to determine the temperature detected by the resonator structure.

7. The system of claim 6 wherein the resonator structure comprises at least a copper resonator.

8. The system of claim 6 wherein the integrated circuit is a microprocessor chip.

9. The system of claim 6 wherein the output signal from the resonator structure comprises a current having a frequency that changes as the resonator structure natural frequency changes with temperature of the resonator structure, wherein a voltage applied to the resonator structure results in a proportional change in output current amplitude.

10. The system of claim 9 wherein an oscillator circuit generates a digital output signal with a frequency equal to the frequency of the output current generated from the resonator structure.

11. A thermal management system comprising:
- an interconnect layer of an integrated circuit, the interconnect layer including a layer of a dielectric material and a plurality of interconnects extending through the layer of the dielectric material, wherein the layer of the dielectric material comprises a channel formed therein, wherein sidewalls of the channel are formed by the dielectric material;
- a micro-electro-mechanical system (MEMS) resonator structure to provide an output signal corresponding to a temperature detected by the resonator structure, wherein a metal portion of the resonator structure is disposed within the channel, wherein the metal portion of the resonator structure includes exterior sides which each face a respective opposing sidewall formed by the dielectric material, wherein an air gap separates the exterior sides of the metal portion of the resonator structure each from the respective opposing sidewall formed by the dielectric material, the air gap to allow the metal portion of the resonator structure to resonate within the channel;
- a seal enclosing the MEMS resonator structure with the interconnect layer, wherein one or more vias extend through the seal and couple to the resonator structure, wherein the resonator structure is suspended in the channel with the one or more vias;
- a connector to receive the output signal; and
- a thermal management circuit coupled with the connector, the thermal management circuit to monitor the output signal, to calculate thermal condition data, and to store the thermal condition data in a memory.

12. The thermal management system of claim 11 wherein the integrated circuit is a microprocessor chip.

13. The integrated circuit of claim 11, wherein the seal comprises a nitride layer.

14. The integrated circuit of claim 1, further comprising an electrode disposed in the interconnect layer under the channel.

15. The integrated circuit of claim 14, wherein a portion of the layer of the dielectric material is between the electrode and the resonator structure.

16. The thermal management system of claim 11 wherein the output signal from the resonator structure comprises a current having a frequency that changes as the resonator structure natural frequency changes with temperature of the resonator structure, wherein a voltage applied to the resonator structure results in a proportional change in output current amplitude.

17. The thermal management system of claim 16 wherein an oscillator circuit generates a digital output signal with a frequency equal to the frequency of the output current generated from the resonator structure.

18. The thermal management system of claim 16 wherein the resonator structure comprises a copper resonator structure.

* * * * *